(12) United States Patent
Harada

(10) Patent No.: US 8,568,750 B2
(45) Date of Patent: Oct. 29, 2013

(54) DEFORMED SHAPED PARTICLES AND METHOD FOR PRODUCING THE SAME

(75) Inventor: Ryosuke Harada, Shiga (JP)

(73) Assignee: Sekisui Plastics Co., Ltd., Osaka (JP)

( * ) Notice: Subject to any disclaimer, the term of this patent is extended or adjusted under 35 U.S.C. 154(b) by 0 days.

(21) Appl. No.: 13/201,305

(22) PCT Filed: Mar. 26, 2010

(86) PCT No.: PCT/JP2010/055428
§ 371 (c)(1),
(2), (4) Date: Aug. 12, 2011

(87) PCT Pub. No.: WO2010/113812
PCT Pub. Date: Oct. 7, 2010

(65) Prior Publication Data
US 2011/0287076 A1    Nov. 24, 2011

(30) Foreign Application Priority Data

Mar. 30, 2009  (JP) ................. 2009-081919
Sep. 29, 2009  (JP) ................. 2009-224958

(51) Int. Cl.
*C09D 133/06* (2006.01)
*A61K 8/81* (2006.01)
*A61Q 19/00* (2006.01)

(52) U.S. Cl.
USPC ........ 424/401; 424/78.03; 428/323; 428/402; 524/460

(58) Field of Classification Search
None
See application file for complete search history.

(56) References Cited

U.S. PATENT DOCUMENTS

| | | | |
|---|---|---|---|
| 5,401,800 A * | 3/1995 | Hoshino et al. | 524/458 |
| 5,773,519 A * | 6/1998 | Ito et al. | 525/276 |
| 6,476,148 B1 | 11/2002 | Gross | |
| 2009/0036559 A1 | 2/2009 | Cui | |

FOREIGN PATENT DOCUMENTS

| | | |
|---|---|---|
| EP | 0 349 319 | 1/1990 |
| JP | 63-223018 | 9/1988 |
| JP | 1-268704 | 10/1989 |
| JP | 7-188313 | 7/1995 |
| JP | 2000-038455 | 2/2000 |
| JP | 2004-076216 | 3/2004 |
| JP | 2006-219559 | 8/2006 |
| JP | 2006-274238 | 10/2006 |
| JP | 2009-161600 | 7/2009 |

OTHER PUBLICATIONS

Jiang et al., "Synthesis of Amphiphilic Mushroom Cap-shaped Colloidal Particles towards Fabrication of Anisotropic Colloidal Crystals", Macromolecular Rapid Communications, Jun. 22, 2010, vol. 31, pp. 1422-1426.
Okubo et al., "Preparation of "Mushroom-like" Janus particles by site-selective surface-initiated atom transfer radical polymerization in aqueous dispersed systems", Langmuir, vol. 26, No. 11, Feb. 16, 2010, pp. 7843-7847.
Extended European Search Report issued with respect to corresponding European Application No. 10 75 8584, dated Oct. 25, 2012.

* cited by examiner

*Primary Examiner* — Robert A Wax
*Assistant Examiner* — Randeep Singh
(74) *Attorney, Agent, or Firm* — Greenblum & Bernstein, P.L.C.

(57) ABSTRACT

A method for producing a deformed shaped particles comprising step of: absorbing a polymerizable vinyl type monomer contained in an aqueous emulsion in a seed particles and polymerizing an absorbed polymerizable vinyl type monomer, wherein
the seed particles are a resin particles which are derived from a (meth)acrylic ester having an ester part containing at least an alkyl group with a number of carbon atoms of 3 or more and less than 6, and which have a weight average molecular weight of 150000 to 1000000 (measured by GPC: gel permeation chromatography) and
the polymerizable vinyl type monomer contains 5 to 50 wt. % of a crosslinkable monomer to the entire amount of the polymerizable vinyl type monomer.

14 Claims, 5 Drawing Sheets

(a)          (b)

(c)          (d)

DEFORMED SHAPED PARTICLES AND METHOD FOR PRODUCING THE SAME

TECHNICAL FIELD

The invention relates to deformed shaped particles and a method for producing the particles. More particularly, the invention relates to deformed shaped particles usable as additives for coating agents to be used for painting materials, paper, information recording paper, light diffusion films, etc., and additives for cosmetics, and a method for producing the particles.

BACKGROUND ART

As a method for producing resin particles is known a seed polymerization method. The seed polymerization method is a method for absorbing a monomer contained in an aqueous emulsion in spherical seed particles of a polymer previously produced in an aqueous solvent and then polymerizing the monomer. In this method, resin particles with high sphericity reflecting the sphericity of the seed particles can be formed.

Resin particles are easy to control their characteristics by adjusting polymerization components, a crosslinking density, etc. Therefore, resin particles are used as additives for coating agents to be used for painting materials, paper, information recording paper, light diffusion films, etc., and additives for cosmetics.

However, in recent years, since characteristics which cannot be obtained in the case of high sphericity are obtained, resin particles controlled to have deformed shapes as particle shapes are produced and used as the above-mentioned additives.

For example, Japanese Patent Application Publication No. 2000-38455 (Patent Document 1) discloses a method for producing approximately flat resin particles by a seed polymerization method.

PRIOR ART DOCUMENT

Patent Document

Patent Document 1: Japanese Patent Application Publication No. 2000-38455

DISCLOSURE OF THE INVENTION

Problem to be Solved by the Invention

However, the shapes of the resin particles obtained by the production method described in the above-mentioned Patent Document are merely flat and it has been difficult to arbitrarily control the shapes of the resin particles.

Consequently, it has been desired to provide a method which can efficiently produce deformed shaped particles while arbitrarily controlling shapes.

Means for Solving the Problem

Accordingly, the invention provides a method for producing a deformed shaped particles comprising step of: absorbing a polymerizable vinyl type monomer contained in an aqueous emulsion in a seed particles and polymerizing an absorbed polymerizable vinyl type monomer, wherein the seed particles are a resin particles which are derived from a (meth)acrylic ester having an ester part containing at least an alkyl group with a number of carbon atoms of 3 or more and less than 6, and which have a weight average molecular weight of 150000 to 1000000 (measured by GPC: gel permeation chromatography) and the polymerizable vinyl type monomer contains 5 to 50 wt. % of a crosslinkable monomer to the entire amount of the polymerizable vinyl type monomer.

Further, the invention provides deformed shaped particles having a recessed sectional shape with one notch part continued in the diameter direction and obtained by the above-mentioned method.

Furthermore, the invention provides mushroom-type deformed shaped particles obtained by the above-mentioned method.

Still more, the invention provides a semi-spherical or double sided convex lens-like deformed shaped particles obtained by the above-mentioned method.

Still more, the invention provides a deformed shaped particles comprising one notch part continued in the diameter direction and made of a polymer derived from a polymerizable vinyl type monomer containing 5 to 50 wt. % of a crosslinkable monomer.

Furthermore, the invention provides a deformed shaped particles comprising a mushroom-type shape and a polymer derived from a polymerizable vinyl type monomer containing 5 to 50 wt. % of a crosslinkable monomer.

Effect of the Invention

According to the invention, deformed shaped particles can be efficiently produced while their shapes being arbitrarily controlled.

MODE FOR CARRYING OUT THE INVENTION

Hereinafter, the invention will be described. In a method for producing deformed shaped particles of the invention, deformed shaped particles are obtained by employing a so-called seed polymerization for making seed particles absorb a polymerizable vinyl type monomer in an aqueous emulsion and polymerizing the absorbed polymerizable vinyl type monomer.

(Shape of Deformed Shaped Particles)

The method for producing deformed shaped particles of the invention can separately produce deformed shaped particles with various kinds of shapes. For example, the deformed shaped particles include particles with a recessed sectional shape (hereinafter, a horseshoe type sectional shape) having one notch part continued in the diameter direction, a mushroom-type shape, a semi-spherical shape, or a double sided convex lens-like shape. Such deformed shaped particles are useful as additives for coating agents to be used for painting materials, paper, information recording paper, light diffusion films, etc., and additives for cosmetics.

The above-mentioned shapes will be described with reference to FIGS. 1(a) to 1(d).

Figure 1:
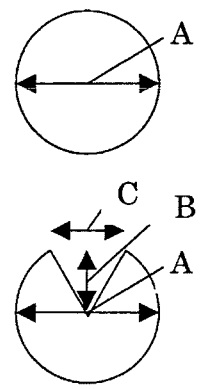
FIG. 1 is a schematic explanatory drawing of deformed shaped particles of the invention.
Figure 1:
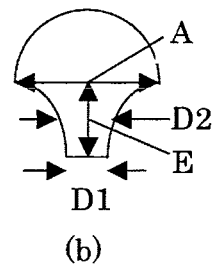
Figure 1:
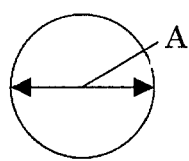
Figure 1:
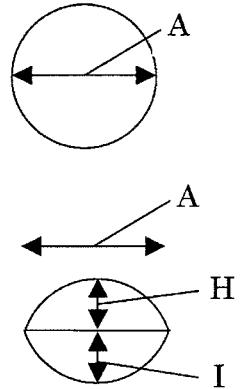

FIG. 1(a) is a projection drawing of deformed shaped particles having the horseshoe type sectional shape: the upper drawing is a drawing with the maximum projected area and the lower drawing is a drawing with the minimum projected area. The outer shape of the particles of the upper drawing with the maximum projected area is circular. Also, the outer shape of the particles of the lower drawing with the minimum projected area is a shape composed of a recessed part corresponding to the projection drawing of the notch part, and a sector form. Herein, the deformed shaped particles having the recessed part with a depth B 0.1 to 0.9 times as deep as a particle diameter A of resin particles and a width C of an opened part 0.1 to 0.95 times as wide as the particle diameter A can be produced by the production method of the invention.

FIG. 1(b) is a drawing of mushroom-type deformed shaped particles with the minimum projected area. In this drawing, the deformed shaped particles are each composed of an umbrella part and an axial part. Herein, deformed shaped particles having a width D1 of a bottom of an axial part 0.1 to 0.8 times as wide as the particle diameter A of the resin particles, a width D2 of a middle part of the axial part 0.2 to 0.9 times as wide as the particle diameter A of the resin particles, and a height E in an axial direction 0.2 to 1.5 times as high as the particle diameter A of the resin particles can be produced by the production method of the invention.

FIG. 1(c) is a projection drawing of semi-spherical deformed shaped particles: the upper drawing is a drawing with the maximum projected area and the lower drawing is a drawing with the minimum projected area. In the drawing with the minimum projected area, deformed shaped particles having a height F 0.2 to 0.8 times as high as the particle diameter A of the resin particles can be produced by the production method of the invention.

FIG. 1(d) is a projection drawing of double sided convex lens-like (go stone-like) deformed shaped particles: the upper drawing is a drawing with the maximum projected area and the lower drawing is a drawing with the minimum projected area. In the drawing with the minimum projected area, deformed shaped particles having heights of the convex lens H and I 0.2 to 0.8 times as high as the particle diameter A of the resin particles can be produced by the production method of the invention.

In FIGS. 1(a) to 1(d), the particle diameter A can be adjusted to be in a range of 0.5 to 30 μm. A volume average particle diameter in conversion into spheres of the deformed shaped particles can be adjusted to be in a range of 0.5 to 30 μm.

Additionally, FIGS. 1(a) to 1(d) show ideal shapes for explanation of the shapes of the deformed shaped particles, and actually deformed shaped particles having slight expansions or dents are also within the scope of the invention. Furthermore, deformed shaped particles with uneven shapes other than those described above can also be obtained.

The shapes of the deformed shaped particles can be separately formed by properly adjusting a use ratio of raw materials, polymerization conditions, etc. For example, the shapes can be separately formed by adjusting the composition of the seed particles, the weight average molecular weight of the seed particles, the use amount of the polymerizable vinyl type monomer to the seed particles, and the use amount of the (meth)acrylic ester having an alkylene oxide group. For example, in the case the use amount of the polymerizable vinyl type monomer to the seed particles is increased, the deformed shaped particles with the horseshoe type sectional shape are easy to be obtained. Further, in the case no (meth) acrylic ester having the alkylene oxide group is used, the double sided convex lens-like deformed shaped particles are easy to be obtained: in the case a small amount is used, the semi-spherical deformed shaped particles are easy to be obtained: and in the case the use amount is increased, the deformed shaped particles with the horseshoe type sectional shape are easy to be obtained. Furthermore, in the case the molecular weight of the seed particles is low, the deformed shaped particles with the horseshoe type sectional shape are easy to be obtained, and in the case the molecular weight is further increased, the mushroom-type deformed shaped particles are easy to be obtained.

(Raw Materials for Producing Deformed Shaped Particles and Production Method Therefor)

Hereinafter, raw materials for producing deformed shaped particles and a production method will be described.

(1) Seed Particles

Seed particles are resin particles derived from a monomer containing a (meth)acrylic ester having an alkyl group with a number of carbon atoms of 3 or more and less than 6 in at least the ester part. It is preferable that 50 wt. % or more of the (meth)acrylic ester having an alkyl group with a number of carbon atoms of 3 or more and less than 6 is contained in the monomer for forming the resin particles. The resin particles derived from such a monomer tend to be non-spherical (deformed shaped) particles. Examples of the alkyl group include a straight chain alkyl group such as n-propyl, n-butyl, and n-pentyl; and a branched alkyl group such as isopropyl, isobutyl, and tert-butyl. Concrete examples of the (meth) acrylic ester are monomers such as n-propyl(meth)acrylate, isopropyl(meth)acrylate, n-butyl(meth)acrylate, isobutyl (meth)acrylate, and tert-butyl(meth)acrylate. These monomers may be used alone or two or more of them may be mixed and used. Especially, resin particles using a (meth)acrylic ester having a branched alkyl group (e.g., isopropyl, isobutyl, and tert-butyl) are preferable since the resin particles are easy to be non-spherical (deformed shaped) particles.

The weight average molecular weight of the seed particles is in a range of 150000 to 1000000 measured by GPC (gel permeation chromatography) and preferably in a range of 200000 to 800000. If the weight average molecular weight is higher than 1000000, deformed shaped particles are difficult to be obtained and spherical particles may possibly be mixed. That is, if the weight average molecular weight is higher than 1000000, the monomer absorbing capability of the seed particles may be lowered in some cases. As a result, since the monomer may possibly be polymerized by itself without being absorbed, spherical resin particles different from aimed resin particles may sometimes be produced. On the other hand, if the weight average molecular weight of the seed particles is 150000 or lower, a phase separation of the seed particles and the polymerizable vinyl type monomer cannot be carried out well and thus it becomes difficult to obtain aimed deformed shaped particles.

Additionally, the size or shape of the seed particles is not particularly limited. Normally, spherical particles with a particle diameter of 0.1 to 5 μm are used for the seed particles.

(2) Method for Producing Seed Particles

A method for producing seed particles is not particularly limited and a known method such as an emulsion polymerization, a soap-free emulsion polymerization, a seed polymerization, and a suspension polymerization. In consideration of the uniformity of the particle diameter of the seed particles and simplicity of the production method, emulsion polymerization, soap-free emulsion polymerization, and seed polymerization methods are preferable.

The polymerization may be carried out in the presence of a molecular weight adjustment agent. Examples usable as the molecular weight adjustment agent are chain transfer agents e.g., an α-methylstyrene dimer; mercaptans such as n-octyl mercaptan and tert-dodecyl mercaptan; terpenes such as tert-terpinene and dipentene; and halogenated hydrocarbons (e.g., chloroform, tetrachloromethane). It is preferable to use the molecular weight adjustment agent in a range of 0.1 to 10 parts by weight to 100 parts by weight of the monomer for producing the seed particles.

(3) Polymerizable Vinyl Type Monomer

The polymerizable vinyl type monomer is not particularly limited if it is a monomer containing 5 to 50 wt. % of a crosslinkable monomer. The crosslinkable monomer is not particularly limited and known monomers are all usable. Examples are the following monomers.

Usable examples of the crosslinkable monomer are poly-functional monomers having two or more polymerizable vinyl groups in a molecule such as ethylene glycol dimethacrylate, trimethylolpropane trimethacrylate, and divinylbenzene. The use amount of the crosslinkable monomer is 5 to 50 wt. % to the total amount of the polymerizable vinyl type monomer. In the case the ratio of the crosslinkable monomer is less than 5 wt. % or more than 50 wt. %, a deformation is slight and almost spherical particles are sometimes obtained. The use amount is more preferable to be 10 to 40 wt. %.

Based on the necessity, the polymerizable vinyl type monomer may include other monomers. Other monomers may include (meth)acrylic acid derivatives such as (meth)acrylic acid, methyl(meth)acrylate, ethyl(meth)acrylate, n-butyl(meth)acrylate, isobutyl(meth)acrylate, tert-butyl (meth)acrylate, (meth)acrylamide, 2-hydroxyethyl(meth) acrylate, and glycidyl(meth)acrylate; vinyl acetate; and acrylonitrile.

Especially, (meth)acrylic esters each having an alkylene oxide group are preferable since it is easy to obtain non-spherical particles. Examples of such a (meth)acrylic ester include compounds defined by the following formula 1.

[Chemical 1]

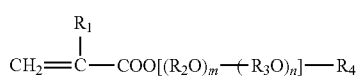

In the formula, $R_1$ is H or $CH_3$; $R_2$ and $R_3$ are different from each other and each an alkylene group selected from $C_2H_4$, $C_3H_6$, $C_4H_8$, and $C_5H_{10}$; m is 0 to 50; n is 0 to 50 (provided that m and n are not simultaneously 0); and $R_4$ is H or $CH_3$.

In the monomer defined by the formula 1, in the case m is more than 50 and n is more than 50, a polymerization stability is lowered and bonded particles may be produced in some times. A preferable range of m and n is 0 to 30 and a more preferable range thereof is 0 to 15.

Commercialized products may be used as the (meth) acrylic ester having an alkylene oxide group. Examples of the commercialized products are Blemmer series produced by Nippon Oil 86 Fats Co., Ltd. Further, preferable examples among the Blemmer series are Blemmer 50 PEP-300 ($R_1$ is $CH_3$; $R_2$ is $C_2H_5$; $R_3$ is $C_3H_6$; m and n satisfy m=3.5 and n=2.5 on average giving a mixture; and $R_4$ is H), Blemmer-70PEP-350B ($R_1$ is $CH_3$; $R_2$ is $C_2H_5$; $R_3$ is $C_3H_6$; m and n satisfy m=3.5 and n=2.5 on average giving a mixture; and $R_4$ is H), Blemmer-PP-1000 ($R_1$ is $CH_3$; $R_3$ is $C_3H_6$; m=0 and n=4 to 6 on average giving a mixture; and $R_4$ is H), and Blemmer-PME-400 ($R_1$ is $CH_3$; $R_2$ is $C_2H_5$; m=9 on average giving a mixture and n=0; and $R_4$ is $CH_3$).

The use amount of the above-mentioned (meth)acrylic ester having an alkylene oxide group is preferably 0 to 40 wt. %, more preferably 1 to 40 wt. %, furthermore preferably 5 to 30 wt. %, and even more preferably 10 to 20 wt. %, to the total amount of the polymerizable vinyl type monomer. If the use amount exceeds 40 wt. %, the polymerization stability is lowered and agglomerated particles may be increased in some cases.

(4) Method for Producing Deformed Shaped Particles

A method for producing deformed shaped particles is a so-called seed polymerization method for making seed particles absorb the polymerizable vinyl type monomer in the aqueous emulsion and then polymerizing the absorbed polymerizable vinyl type monomer. Hereinafter, a common method of the seed polymerization method will be described; however, it is not limited to this method.

At first, seed particles are added to the aqueous emulsion composed of the polymerizable vinyl type monomer and the aqueous medium.

Examples of the aqueous medium include water and a mixed medium of water and a water-soluble medium (e.g., a lower alcohol).

The aqueous medium includes a surfactant. Examples usable as the surfactant may include all anionic, cationic, nonionic, and amphoteric ones.

Examples of the anionic surfactant include fatty acid oils such as sodium oleate and potassium castorate; alkyl sulfate esters such as sodium lauryl sulfate and ammonium lauryl sulfate; alkylbenzenesulfonic acid salts such as sodium dodecylbenzene sulfonate; alkylnaphthalene sulfonic acid salts; alkanesulfonic acid salts; dialkylsulfosuccinic acid salts such as sodium dioctylsulfosuccinate; alkenylsuccinic acid salts (e.g., dipotassium salts), alkylphosphoric acid esters; naphthalenesulfonic acid formalin condensates; polyoxyethylene alkyl ether sulfates such as polyoxyethylene alkylphenyl ether sulfate salts, polyoxyethylene lauryl ether sulfuric acid sodium salts; and polyoxyethylene alkylsulfuric acid ester salts.

Examples of the cationic surfactant include alkylamine salts such as laurylamine acetate and stearylamine acetate; and quaternary ammonium salts such as lauryltrimethylammonium chloride.

Examples of the amphoteric surfactant include lauryldimethylamine oxide, or phosphoric acid ester type or phosphorous acid ester type surfactants.

The above-mentioned surfactants may be used alone or two or more types of them may be used in combination. In terms of the dispersion stability at the time of polymerization, the anionic surfactant is preferable among the above-mentioned surfactants.

The aqueous emulsion can be produced by a known method. For example, the aqueous emulsion can be obtained by adding the polymerizable vinyl type monomer in the aqueous medium and dispersing the monomer by a micro-emulsifying apparatus such as a homogenizer, an ultrasonic treatment apparatus, and a nano-mizer. The polymerizable vinyl type monomer may include a polymerization initiator if necessary. The polymerization initiator may be dispersed in the aqueous medium after previously mixed with the polymerizable vinyl type monomer or may be mixed in the aqueous medium separately from the monomer. A particle diameter of droplets of the polymerizable vinyl type monomer in the obtained aqueous emulsion is preferable to be smaller than that of the seed particles since the polymerizable vinyl type monomer is efficiently absorbed in the seed particles.

The seed particles may be added directly to the aqueous emulsion or may be added while being dispersed in a water-based dispersion medium (hereinafter, referred to as seed particles dispersion).

After addition of the seed particles in the aqueous emulsion, the polymerizable vinyl type monomer is absorbed in the seed particles. The absorption can be carried out generally by stirring the aqueous emulsion after addition of the seed particles at room temperature (about 20° C.) for 1 to 12 hours. Further, the absorption may be accelerated by heating the aqueous emulsion to around 30 to 50° C.

The seed particles are swollen by absorption of the polymerizable vinyl type monomer. A mixing ratio of the polymerizable vinyl type monomer and the seed particles is preferably in a range of 5 to 150 parts by weight and more preferably in a range of 10 to 120 parts by weight of the polymerizable vinyl type monomer to 1 part by weight of the seed particles. If the mixing ratio of the monomer is low, an increase in particle diameter by polymerization is lowered, so that a productivity is decreased, and if it is high, the polymerizable vinyl type monomer is not completely absorbed in the seed particles and the polymerizable vinyl type monomer is suspension-polymerized by itself in the aqueous medium to produce abnormal particles in some cases. Completion of the absorption can be determined by confirming expansion of the particle diameter through observation with an optical microscope.

A polymerization initiator can be added based on the necessity. Examples of the polymerization initiator include organic peroxides such as benzoyl peroxide, lauroyl peroxide, o-chlorobenzoyl peroxide, o-methoxybenzoyl peroxide, 3,5,5-trimethylhexanoyl peroxide, tert-butylperoxy-2-ethyl hexanoate, and di-tert-butyl peroxide; and azo type compounds such as 2,2'-azobisisobutyronitrile, 1,1'-azobiscyclohexane carbonitrile, and 2,2'-azobis(2,4-dimethylvaleronitrile). The polymerization initiator is preferable to be used at a ratio in a range of 0.1 to 3 parts by weight to 100 parts by weight of the polymerizable vinyl type monomer.

Next, deformed shaped particles can be obtained by polymerizing the polymerizable vinyl type monomer absorbed in the seed particles.

A polymerization temperature can be properly selected in accordance with the types of the polymerizable vinyl type monomer and the polymerization initiator. The polymerization temperature is preferably 25 to 110° C. and more preferably 50 to 100° C. The polymerization reaction is preferably carried out by increasing the temperature after the monomer and arbitrarily the polymerization initiator is completely absorbed in the seed particles. After completion of the polymerization, if necessary, the deformed shaped particles are separated by centrifugation to remove the aqueous medium, washed with water and a solvent, thereafter dried and isolated.

In the polymerization process, to improve the dispersion stability of the deformed shaped particles, a polymer dispersion stabilizer may be added.

Examples of the polymer dispersion stabilizer include polyvinyl alcohol, polycarboxylic acid, celluloses (hydroxyethyl cellulose, carboxymethyl cellulose, etc.), and polyvinylpyrrolidone. Further, an inorganic water-soluble polymer compound such as sodium tripolyphosphate can be used in combination. Among them, polyvinyl alcohol and polyvinylpyrrolidone are preferable. The addition amount of the polymer dispersion stabilizer is preferably 1 to 10 parts by weight to 100 parts by weight of the polymerizable vinyl type monomer.

Further, a water-soluble polymerization inhibitor such as nitrous acid salts, sulfurous acid salts, hydroquinones, ascorbic acids, water-soluble vitamin B, citric acid, and polyphenols may be used for suppressing generation of emulsified particles in a water system.

(Use of Deformed Shaped Particles)

The deformed shaped particles of the invention are useful as additives for coating agents (compositions for coating) to be used for painting materials, paper, information recording paper, light diffusion films (optical sheets), etc.; additives for master pellets for forming a molded article such as a light diffusion plate and a light guide plate; and additives for cosmetics.

(1) Coating Agents

Herein, the coating agent may contain an arbitrary binder.

The binder is not particularly limited and known binders are all usable. Examples are acrylic binders such as trade names, Dianal LR-102 and Dianal BR-106, produced by Mitsubishi Rayon Co., Ltd. The content of the deformed shaped particles in a coating agent may be properly adjusted in accordance with the use and it may be in a range of 0.1 to 1000 parts by weight to 100 parts by weight of the binder.

Generally, a dispersion medium is contained in the coating agent. Both of water-based and oil-based media can be used as the dispersion medium. Examples of the oil-based medium include hydrocarbon type solvents such as toluene and xylene; ketone type solvents such as methyl ethyl ketone and methyl isobutyl ketone; ester type solvents such as ethyl acetate and butyl acetate; and ether type solvents such as dioxane and ethylene glycol diethyl ether. Examples of the aqueous medium include water and alcohol type solvents.

Further, the coating agent may contain other additives such as a curing agent, a coloring agent, an antistatic agent, and a leveling agent.

A substrate to be coated with the coating agent is not particularly limited and any substrate can be used in accordance with the use. For example, in optical use, a transparent substrate such as a glass substrate and a transparent resin substrate is used.

(2) Master Pellets

Master pellets contain the deformed shaped particles and a base resin.

The base resin is not particularly limited if it is a general thermoplastic resin. Examples include (meth)acrylic resins, alkyl(meth)acrylate-styrene copolymer resins, polycarbonate resins, polyester resins, polyethylene resins, polypropylene resins, and polystyrene resins. Especially, in the case transparency is required, (meth)acrylic resins, alkyl(meth)acrylate-styrene copolymer resins, polycarbonate resins, and polyester resins are suitable. These base resins may be used alone or two or more types of them may be used in combination. The base resin may contain a small amount of an additive such as an ultraviolet ray absorbent, a heat stabilizer, a coloring agent, and a filler.

The master pellets can be produced by melting and kneading the deformed shaped particles and the base resin and molding the mixture by a molding method such as extrusion molding and injection molding. A mixing ratio of the deformed shaped particles in the master pellets is not particularly limited and preferably about 0.1 to 60 wt. %, more preferably about 0.3 to 30 wt. %, and even more preferable about 0.4 to 10 wt. %. If the mixing ratio exceeds 60 wt. %, production of the master pellets sometimes becomes difficult.

On the other hand, if it is below 0.1 wt. %, the effect of the invention may possibly be lowered.

The master pellets are converted into a molded article by, for example, by extrusion molding, injection molding, or press molding. Further, at the time of molding, a substrate resin may be newly added. The addition amount of an added base resin is so preferably adjusted as to control the mixing ratio of the deformed shaped particles contained in the molded article finally obtained in a range of about 0.1 to 60 wt. %. In addition, at the time of molding, a small amount of an additive such as an ultraviolet ray absorbent, a heat stabilizer, a coloring agent, and a filler may be added.

(3) Cosmetics

Concrete examples of cosmetics to which the deformed shaped particles of the invention can be added include solid type cosmetics such as face powders and foundations; powder type cosmetics such as baby powders and body powders; and liquid type cosmetics such as skin lotions, emulsions, creams, and body lotions.

A mixing ratio of the deformed shaped particles to these cosmetics differs in accordance with the type of the cosmetics. For example, in the case of solid type cosmetics such as face powders and foundations, it is preferably 1 to 20 wt. % and particularly preferably 3 to 15 wt. %. Further, in the case of powder type cosmetics such as baby powders and body powders, it is preferably 1 to 20 wt. % and particularly preferably 3 to 15 wt. %. Furthermore, in the case of liquid type cosmetics such as skin lotions, emulsions, creams, liquid foundations, body lotions, and pre-shave lotions, it is preferably 1 to 15 wt. % and particularly preferably 3 to 10 wt. %.

Further, these cosmetics may contain inorganic compounds such as mica and talc; pigments for coloration such as iron oxide, titanium oxide, an ultramarine blue pigment, an iron blue pigment, and carbon black; and an azo type synthetic dyes in order to improve an optical function and a texture. In the case of liquid type cosmetics, an aqueous medium is not particularly limited and water, alcohols, hydrocarbons, silicone oils, plant or animal type oils and fats can be used. Besides the above-mentioned components, these cosmetics can be mixed with other components used commonly for cosmetics such as a moisturizing agent, an anti-inflammatory agent, a whitening agent, a UV care agent, a sterilizer, an antiperspirant, a refrigerant, and a fragrance to add respective kinds of functions.

EXAMPLES

Hereinafter, a production method of the invention will be described more concretely; however, it is not intended that the invention be limited to the illustrated Examples.

(Weight Average Molecular Weight)

The weight average molecular weight (Mw) is measured by gel permeation chromatography (GPC). The weight average molecular weight means the weight average molecular weight converted into polystyrene (PS). Concretely, a measurement is carried out as follows.

Each sample in an amount of 50 mg is dissolved in 10 ml of tetrahydrofuran (THF) and filtered by a nonaqueous chromato-disk with a pore size of 0.45 μm and then subjected to chromatography. The conditions of chromatography are as follows.

Liquid chromatograph: trade name "Gel Permeation Chromatograph HLC-8020", manufactured by Tosoh Corporation Column: trade name "TSKgel GMH-XL-L", 07.8 mm×30 cm×2 columns, manufactured by Tosoh Corporation Column temperature: 40° C.

Carrier gas: tetrahydrofuran

Carrier gas flow rate: 1 ml/min

Injection pump temperature: 35° C.

Detection: RI

Injection amount: 100 μl

Standard polystyrenes for calibration curve: trade name "Shodex", weight average molecular weight: 1030000, manufactured by Showa Denko K. K., and weight average molecular weight: 5480000, 3840000, 355000, 102000, 37900, 9100, 2630, and 870, manufactured by Tosoh Corporation (Average Particle Diameter of Seed Particles)

The average particle diameter of the seed particles is measured by LS 230 model manufactured by Beckman Coulter Inc. Concretely, 0.1 g of the particles and 10 ml of a 0.1% nonionic surfactant solution are loaded and mixed for 2 seconds by TOUCHMIXER MT-31 manufactured by Yamato Scientific Co., Ltd. Thereafter, the mixture is dispersed for 10 minutes by using a test tube and ULTRATRANSONIC CLEARNER VS-150, being a commercialized ultrasonic washing equipment, manufactured by Velvo-Clear Co. The obtained dispersion is subjected to a measurement while being irradiated by an ultrasonic wave with LS 230 model manufactured by Beckman Coulter Inc. An optical model at that time is adjusted in accordance with a refractive index of the produced particles.

(Measurement Method of Lengths A to I of Deformed Shaped Particles)

The lengths A to I of the deformed shaped particles are measured as follows.

Using a scanning electron microscope JSM-6360 LV (manufactured by JEOL Ltd.), thirty arbitrary deformed shaped particles were observed at a magnification of 5,000 to 10,000 and the respective portions are measured and the average values are defined as the lengths A to I.

(Measurement Method of Volume Average Particle Diameter in Conversion into Spheres of Deformed Shaped Particles)

Fine pores with a pore diameter of 50 to 280 μm are filled with an electrolytic solution and the volume of the electrolytic solution is measured from a conductivity fluctuation of the electrolytic solution at the time of passing the particles through the electrolytic solution to calculate the volume average particle diameter in conversion into spheres. Concretely, the measured average particle diameter is a volume average particle diameter measured by Coulter Multisizer II by Beckman Coulter Inc. At the time of measurement, calibration is carried out using apertures proper for the particle diameters of the particles to be measured according to REFERENCE MANUFAL FOR THE COULTER MULTISIZER (1987) issued by Coulter Electronics Limited for the measurement.

Concretely, 0.1 g of the particles and 10 ml of a 0.1% nonionic surfactant solution are loaded to a commercialized test tube made of glass. After the loaded contents are mixed for 2 seconds by TOUCHMIXER MT-31 manufactured by Yamato Scientific Co., Ltd., the mixture in the test tube is pre-dispersed for 10 minutes by ULTRATRANSONIC CLEARNER VS-150, being a commercialized ultrasonic washing equipment, manufactured by Velvo-Clear Co. The obtained dispersion is dropwise added using a dropper to a beaker attached to a main body and filled with ISOTON II (electrolytic solution for measurement, manufactured by Beckman Coulter Inc.) while being moderately stirred, and an indication of a densitometer of the main body image is adjusted to be around 10%. Next, an aperture size, Current Gain and Polarity are inputted to a Multisizer II main body according to REFERENCE MANUFAL FOR THE COULTER MULTISIZER (1987) issued by Coulter Electronics Limited and a measurement is carried out manually.

During the measurement, the contents in the beaker are moderately stirred to such an extent that no bubble is entrained, and when 100000 particles were measured, the measurement is finished.

Synthesis Example 1 of Emulsion for Seed Particle Formation

A separable flask equipped with a stirrer, a thermometer, and a reflux condenser was loaded with 600 g of water, 100 g of methyl methacrylate and 0.5 g of n-dodecyl mercaptan, an inside atmosphere was replaced with nitrogen under stirring, and the contents were heated to 70° C. After an inner temperature in the flask was kept at 70° C. and potassium persulfate as a polymerization initiator was added to the stirred mixture, a polymerization reaction was carried out for 8 hours to obtain an emulsion. The obtained emulsion contained 14% of a solid matter. The solid matter contained spherical particles with a particle diameter of 0.4 μm and a weight average molecular weight of 600000.

Synthesis Example 2 of Emulsion for Seed Particle Formation

A separable flask equipped with a stirrer, a thermometer, and a reflux condenser was loaded with 600 g of water, 100 g of methyl methacrylate and 0.5 g of n-dodecyl mercaptan, an inside atmosphere was replaced with nitrogen under stirring, and the contents were heated to 60° C. After an inner temperature in the flask was kept at 60° C. and potassium persulfate as a polymerization initiator was added to the stirred mixture, a polymerization reaction was carried out for 8 hours to obtain an emulsion. The obtained emulsion contained 14% of a solid matter. The solid matter contained spherical particles with a particle diameter of 0.8 μm and a weight average molecular weight of 600000.

Synthesis Example 3 of Emulsion for Seed Particle Formation

A separable flask equipped with a stirrer, a thermometer, and a reflux condenser was loaded with 600 g of water, 100 g of isobutyl methacrylate and 0.5 g of n-dodecyl mercaptan, an inside atmosphere was replaced with nitrogen under stirring, and the contents were heated to 70° C. After an inner temperature in the flask was kept at 70° C. and potassium persulfate as a polymerization initiator was added to the stirred mixture, a polymerization reaction was carried out for 12 hours to obtain an emulsion. The obtained emulsion contained 14% of a solid matter. The solid matter contained spherical particles with a particle diameter of 0.4 μm and a weight average molecular weight of 300000.

Synthesis Example 4 of Emulsion for Seed Particle Formation

A separable flask equipped with a stirrer, a thermometer, and a reflux condenser was loaded with 600 g of water and 100 g of methyl methacrylate, an inside atmosphere was replaced with nitrogen under stirring, and the contents were heated to 70° C. After an inner temperature in the flask was kept at 70° C. and potassium persulfate as a polymerization initiator was added to the stirred mixture, a polymerization reaction was carried out for 12 hours to obtain an emulsion. The obtained emulsion contained 14% of a solid matter. The solid matter contained spherical particles with a particle diameter of 0.43 μm and a weight average molecular weight of 820000.

Production Example 1 of Seed Particles

A separable flask equipped with a stirrer, a thermometer, and a reflux condenser was loaded with 550 g of water, 70 g of the emulsion obtained by Synthesis Example 1, 100 g of isobutyl methacrylate and 0.3 g of n-dodecyl mercaptan, an inside atmosphere was replaced with nitrogen under stirring, and the contents were heated to 70° C. After an inner temperature was kept at 70° C. and 0.5 g of potassium persulfate as a polymerization initiator was added, a polymerization reaction was carried out for 8 hours. The obtained emulsion contained 14% of a solid matter. The solid matter contained spherical particles (seed particles) with a particle diameter of 1.0 μm and a weight average molecular weight of 610000.

Production Example 2 of Seed Particles

A separable flask equipped with a stirrer, a thermometer, and a reflux condenser was loaded with 550 g of water, 70 g of the emulsion obtained by Synthesis Example 1, 100 g of tert-butyl acrylate and 0.5 g of n-dodecyl mercaptan, an inside atmosphere was replaced with nitrogen under stirring, and the contents were heated to 70° C. After an inner temperature was kept at 70° C. and 0.5 g of potassium persulfate as a polymerization initiator was added, a polymerization reaction was carried out for 12 hours. The obtained emulsion contained 14% of a solid matter. The solid matter contained spherical particles (seed particles) with a particle diameter of 1.0 μm and a weight average molecular weight of 450000.

Production Example 3 of Seed Particles

A separable flask equipped with a stirrer, a thermometer, and a reflux condenser was loaded with 550 g of water, 70 g of the emulsion obtained by Synthesis Example 2, 100 g of isobutyl methacrylate and 0.5 g of n-dodecyl mercaptan, an inside atmosphere was replaced with nitrogen under stirring, and the contents were heated to 70° C. After an inner temperature was kept at 70° C. and 0.5 g of potassium persulfate as a polymerization initiator was added, a polymerization reaction was carried out for 12 hours. The obtained emulsion contained 14% of a solid matter. The solid matter contained spherical particles (seed particles) with a particle diameter of 1.5 μm and a weight average molecular weight of 400000.

Production Example 4 of Seed Particles

A separable flask equipped with a stirrer, a thermometer, and a reflux condenser was loaded with 550 g of water, 70 g of the emulsion obtained by Synthesis Example 1, 100 g of methyl methacrylate and 0.5 g of n-dodecyl mercaptan, an inside atmosphere was replaced with nitrogen under stirring, and the contents were heated to 70° C. After an inner temperature was kept at 70° C. and 0.5 g of potassium persulfate as a polymerization initiator was added, a polymerization reaction was carried out for 8 hours. The obtained emulsion contained 14% of a solid matter. The solid matter contained spherical particles (seed particles) with a particle diameter of 1.0 μm and a weight average molecular weight of 400000.

Production Example 5 of Seed Particles

A separable flask equipped with a stirrer, a thermometer, and a reflux condenser was loaded with 550 g of water, 70 g of the emulsion obtained by Synthesis Example 4 and 100 g of isobutyl methacrylate, an inside atmosphere was replaced with nitrogen under stirring, and the contents were heated to 70° C. After an inner temperature was kept at 70° C. and 0.5 g of potassium persulfate as a polymerization initiator was added, a polymerization reaction was carried out for 8 hours. The obtained emulsion contained 14% of a solid matter and the solid matter contained spherical particles (seed particles) with a particle diameter of 1.0 μm and a weight average molecular weight of 830000.

Production Example 6 of Seed Particles

A separable flask equipped with a stirrer, a thermometer, and a reflux condenser was loaded with 550 g of water, 70 g of the emulsion obtained by Synthesis Example 1, 100 g of isobutyl methacrylate and 1.0 g of n-octyl mercaptan, an inside atmosphere was replaced with nitrogen under stirring, and the contents were heated to 70° C. After an inner temperature was kept at 70° C. and 0.5 g of potassium persulfate as a polymerization initiator was added, a polymerization reaction was carried out for 8 hours. The obtained emulsion contained 14% of a solid matter and the solid matter contained spherical particles (seed particles) with a particle diameter of 1.0 μm and a weight average molecular weight of 25000.

Production Example 7 of Seed Particles

A separable flask equipped with a stirrer, a thermometer, and a reflux condenser was loaded with 550 g of water, 70 g of the emulsion obtained by Synthesis Example 3, 100 g of isobutyl methacrylate and 1.0 g of n-dodecyl mercaptan, an inside atmosphere was replaced with nitrogen under stirring, and the contents were heated to 70° C. After an inner temperature was kept at 70° C. and 0.5 g of potassium persulfate as a polymerization initiator was added, a polymerization reaction was carried out for 12 hours. The obtained emulsion contained 14% of a solid matter and the solid matter contained spherical particles (seed particles) with a particle diameter of 1.0 μm and a weight average molecular weight of 260000.

Production Example 8 of Seed Particles

A separable flask equipped with a stirrer, a thermometer, and a reflux condenser was loaded with 550 g of water, 140 g of the emulsion obtained by Production Example 4 of seed particles, 100 g of isobutyl methacrylate and 0.4 g of n-dodecyl mercaptan, an inside atmosphere was replaced with nitrogen under stirring, and the contents were heated to 70° C. After an inner temperature was kept at 70° C. and 0.5 g of potassium persulfate as a polymerization initiator was added, a polymerization reaction was carried out for 12 hours. The obtained emulsion contained 14% of a solid matter and the solid matter contained spherical particles (seed particles) with a particle diameter of 1.67 μm and a weight average molecular weight of 500000.

Production Example 9 of Seed Particles

A separable flask equipped with a stirrer, a thermometer, and a reflux condenser was loaded with 600 g of water, 90 g of isobutyl methacrylate, 10 g of methyl methacrylate and 0.5 g of n-dodecyl mercaptan, an inside atmosphere was replaced with nitrogen under stirring, and the contents were heated to 70° C. After an inner temperature was kept at 70° C. and potassium persulfate as a polymerization initiator was added, a polymerization reaction was carried out for 12 hours. The obtained emulsion contained 14% of a solid matter and the solid matter contained spherical particles (seed particles) with a particle diameter of 0.6 μm and a weight average molecular weight of 350000.

Example 1

A 5 L reactor equipped with a stirrer and a thermometer was loaded with 600 g of methyl methacrylate, 300 g of ethylene glycol dimethacrylate and 100 g of poly(ethylene glycol propylene glycol)monomethacrylate (product name: Blemmer 50 PEP-300 produced by Nippon Oil & Fats Co., Ltd.; in the formula 1, $R_1$=$CH_3$; $R_2$=$C_2H_4$; $R_3$=$C_3H_6$; $R_4$=H; m and n satisfy m=3.5 and n=2.5 on average giving a mixture) as polymerizable vinyl type monomers, and 6 g of azobisbutyronitrile as a polymerization initiator, and the contents were mixed. The obtained mixture was mixed with 1 L of ion exchanged water containing 10 g of sodium succinosulfonate as a surfactant and treated by a TK homomixer (manufactured by Primix Corp.) at 8000 rpm for 10 minutes to obtain an aqueous emulsion. While being stirred, 360 g of the emulsion containing seed particles with an average particle diameter of 1.0 μm and obtained in Production Example 1 of seed particles was added to the aqueous emulsion.

Figure 2:
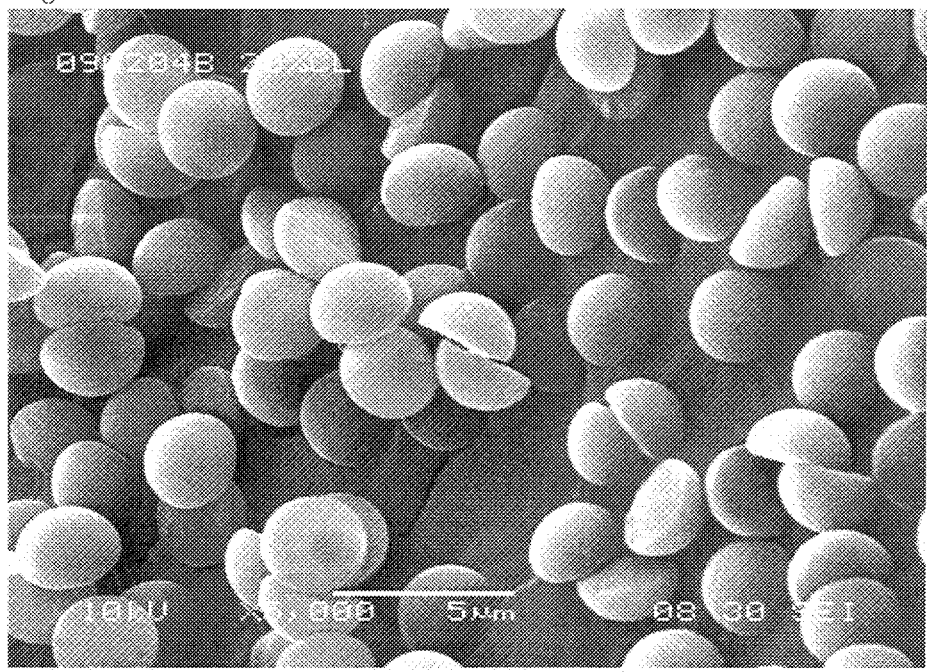
FIG. 2 is a scanning electron microscopic photograph of deformed shaped particles of Example 1.

After stirring was continued for 3 hours, the resulting dispersion was observed by an optical microscope to find that the polymerizable vinyl type monomers in the aqueous emulsion were absorbed in the seed particles (a swelling magnification was about 20 times as large). Thereafter, 2000 g of an aqueous solution with 40 g of polyvinyl alcohol (PVA-224E, manufactured by Kuraray Co., Ltd.) as a dispersion stabilizer dissolved therein was charged in the reactor and a polymerization was carried out at 60° C. for 6 hours under stirring. When the obtained resin particles were observed by a scanning electron microscope, the resin particles were semi-spherical deformed shaped particles as shown in FIG. 2 (A=2.92 μm, F=1.71 μm). The volume average particle diameter in conversion into spheres of the deformed shaped particles was 2.60 μm.

Example 2

Resin particles were obtained in the same manner as in Example 1, except that 700 g of methyl methacrylate, 200 g of ethylene glycol dimethacrylate and 100 g of poly(ethylene glycol propylene glycol)monomethacrylate (product name: Blemmer 50 PEP-300 produced by Nippon Oil 86 Fats Co., Ltd.) were used as polymerizable vinyl type monomers. When the obtained resin particles were observed by a scanning electron microscope, the resin particles were semi-spherical deformed shaped particles (A=2.92 μm, F=1.55 μm). The volume average particle diameter in conversion into spheres of the deformed shaped particles was 2.63 μm.

Example 3

Resin particles were obtained in the same manner as in Example 1, except that 800 g of methyl methacrylate, 100 g of ethylene glycol dimethacrylate and 100 g of poly(ethylene glycol propylene glycol)monomethacrylate (product name: Blemmer 50 PEP-300 produced by Nippon Oil 86 Fats Co., Ltd.) were used as polymerizable vinyl type monomers. When the obtained resin particles were observed by a scanning electron microscope, the resin particles were semi-spherical deformed shaped particles (A=2.80 μm, F=1.50

μm). The volume average particle diameter in conversion into spheres of the deformed shaped particles was 2.59 μm.

Example 4

Resin particles were obtained in the same manner as in Example 1, except that the emulsion containing seed particles produced by Production Example 7 of seed particles was used. When the obtained resin particles were observed by a scanning electron microscope, the resin particles were semi-spherical deformed shaped particles (A=2.85 μm, F=1.69 μm). The volume average particle diameter in conversion into spheres of the deformed shaped particles was 2.56 μm.

Example 5

Resin particles were obtained in the same manner as in Example 1, except that 650 g of methyl methacrylate, 300 g of ethylene glycol dimethacrylate and 50 g of poly(ethylene glycol propylene glycol)monomethacrylate (product name: Blemmer 50 PEP-300 produced by Nippon Oil 86 Fats Co., Ltd.) were used as polymerizable vinyl type monomers and the emulsion containing seed particles produced by Production Example 3 of seed particles was used. When the obtained resin particles were observed by a scanning electron microscope, the resin particles were semi-spherical deformed shaped particles (A=4.48 μm, F=2.51 μm). The volume average particle diameter in conversion into spheres of the deformed shaped particles was 4.08 μm.

Example 6

Figure 3:
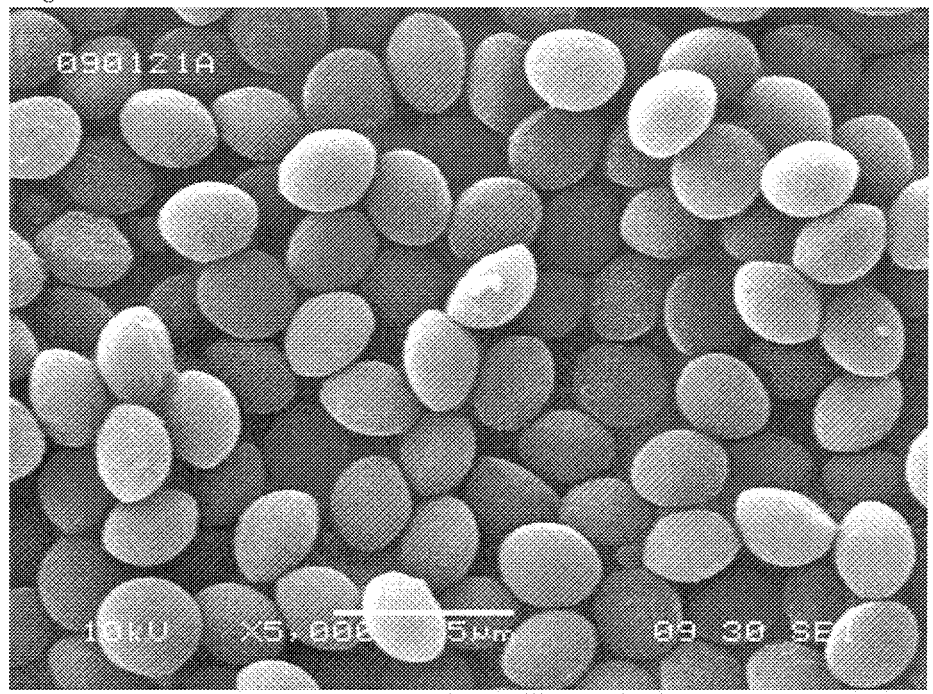
FIG. 3 is a scanning electron microscopic photograph of deformed shaped particles of Example 6.

Resin particles were obtained in the same manner as in Example 1, except that 700 g of methyl methacrylate, 300 g of ethylene glycol dimethacrylate and no poly(ethylene glycol propylene glycol)monomethacrylate were used as polymerizable vinyl type monomers. When the obtained resin particles were observed by a scanning electron microscope, the resin particles were double sided convex lens-like particles as shown in FIG. 3 (A=2.88 μm, H=1.27 μm, I=0.64 μm). The volume average particle diameter in conversion into spheres of the deformed shaped particles was 2.61 μm.

Example 7

Resin particles were obtained in the same manner as in Example 1, except that styrene was used in place of methyl methacrylate and the swelling magnification was adjusted to be about 40 times as large. When the obtained resin particles were observed by a scanning electron microscope, the resin particles were double sided convex lens-like particles (A=3.30 μm, H=1.51 μm, I=0.81 μm). The volume average particle diameter in conversion into spheres of the deformed shaped particles was 3.09 μm.

Example 8

Resin particles were obtained in the same manner as in Example 1, except that styrene was used in place of methyl methacrylate. When the obtained resin particles were observed by a scanning electron microscope, the resin particles were double sided convex lens-like particles (A=2.80 μm, H=1.20 μM, I=0.61 μm). The volume average particle diameter in conversion into spheres of the deformed shaped particles was 2.58 μm.

Example 9

Figure 4:
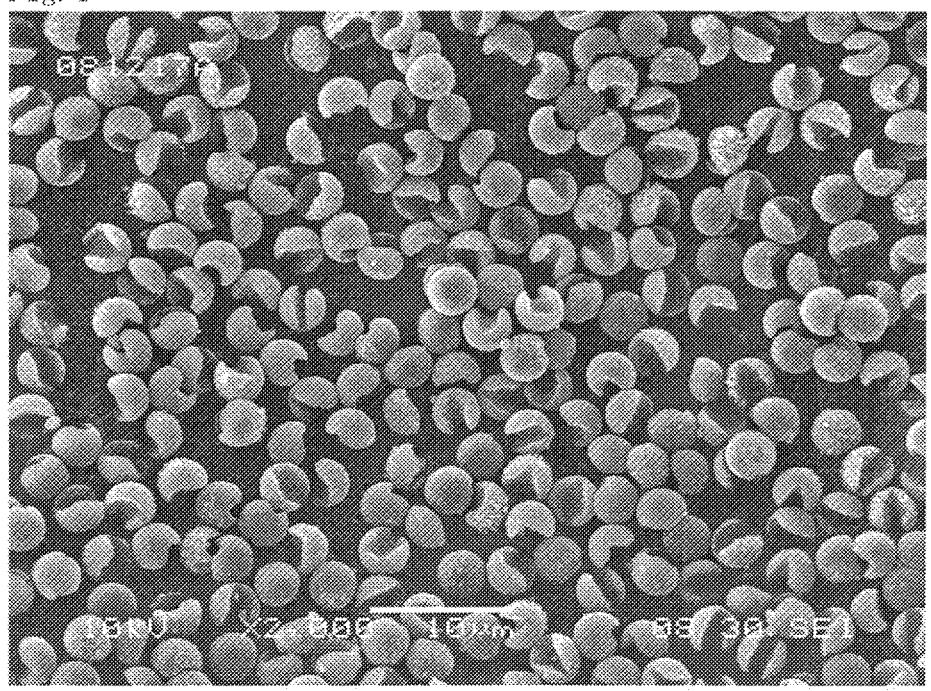
FIG. 4 is a scanning electron microscopic photograph of deformed shaped particles of Example 9.

Resin particles were obtained in the same manner as in Example 1, except that the swelling magnification was adjusted to be about 40 times as large. When the obtained resin particles were observed by a scanning electron microscope, the resin particles were deformed shaped particles having a horseshoe type sectional shape as shown in FIG. 4 (A=3.45 μm, B=1.15 μm, C=1.74 μm). The volume average particle diameter in conversion into spheres of the deformed shaped particles was 3.10 μm.

Example 10

Resin particles were obtained in the same manner as in Example 1, except that the emulsion containing seed particles produced in Production Example 3 of seed particles was used. When the obtained resin particles were observed by a scanning electron microscope, the resin particles were deformed shaped particles having a horseshoe type sectional shape (A=4.66 μm, B=1.81 μm, C=2.28 μm). The volume average particle diameter in conversion into spheres of the deformed shaped particles was 4.09 μm.

Example 11

Resin particles were obtained in the same manner as in Example 1, except that the emulsion containing seed particles produced in Production Example 8 of seed particles was used. When the obtained resin particles were observed by a scanning electron microscope, the resin particles were deformed shaped particles having a horseshoe type sectional shape (A=4.95 μm, B=2.01 μm, C=2.70 μm). The volume average particle diameter in conversion into spheres of the deformed shaped particles was 4.51 μm.

Example 12

Figure 5:
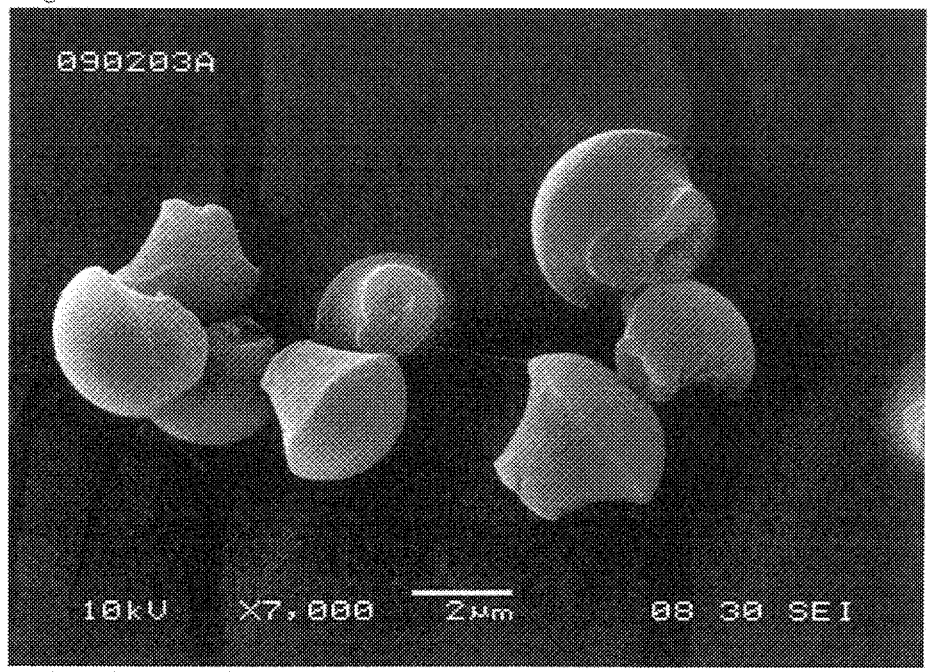
FIG. 5 is a scanning electron microscopic photograph of deformed shaped particles of Example 12.

Resin particles were obtained in the same manner as in Example 1, except that the emulsion containing seed particles produced in Production Example 5 of seed particles was used. When the obtained resin particles were observed by a scanning electron microscope, the resin particles were mushroom-type deformed shaped particles as shown in FIG. 5 (A=3.26 μm, D1=1.43 μm, D2=1.87 μm, E=1.80 μm). The volume average particle diameter in conversion into spheres of the deformed shaped particles was 2.71 μm.

Example 13

Resin particles were obtained in the same manner as in Example 1, except that the emulsion containing seed particles produced in Production Example 9 of seed particles was used. When the obtained resin particles were observed by a scanning electron microscope, the resin particles were double sided convex lens-like particles (A=1.7 μm, H=0.6 μm, I=0.2 μm). The volume average particle diameter in conversion into spheres of the deformed shaped particles was 1.6 μm.

Example 14

Polymer particles were obtained in the same manner as in Example 1, except that 600 g of methyl methacrylate, 300 g of ethylene glycol dimethacrylate and 100 g of poly(propylene glycol)monomethacrylate (product name: Blemmer PP-1000 produced by Nippon Oil 86 Fats Co., Ltd., in the formula 1, $R_1=CH_3$; $R_2=C_3H_6$; $R_4=H$; and m=0 and n=4 to 6 on average giving a mixture) were used as polymerizable vinyl type monomers. When the obtained polymers were observed by a scanning electron microscope, they were semi-spherical particles (A=2.72 µm, F=1.61 µm). The volume average particle diameter in conversion into spheres of the deformed shaped particles was 2.50 µm.

Example 15

Resin particles were obtained in the same manner as in Example 1, except that the emulsion containing seed particles produced in Production Example 2 of seed particles was used. When the obtained resin particles were observed by a scanning electron microscope, the resin particles were double sided convex lens-like particles (A=2.75 µm, H=1.5 µM, I=0.4 µm). The volume average particle diameter in conversion into spheres of the deformed shaped particles was 2.51 µm.

Example 16

Resin particles were obtained in the same manner as in Example 1, except that 600 g of methyl methacrylate, 300 g of ethylene glycol dimethacrylate and 100 g of polyethylene glycol-polypropylene glycol monomethacrylate (Blemmer 70 PEP-350B) were used as polymerizable vinyl type monomers and the emulsion containing seed particles produced in Production Example 5 of seed particles was used. When the obtained resin particles were observed by a scanning electron microscope, the resin particles were mushroom-type deformed shaped particles (A=2.63 µm, D1=0.94 µm, D2=1.37 µm, E=0.85 µm). The volume average particle diameter in conversion into spheres of the deformed shaped particles was 2.62 µm.

Example 17

Figure 6:
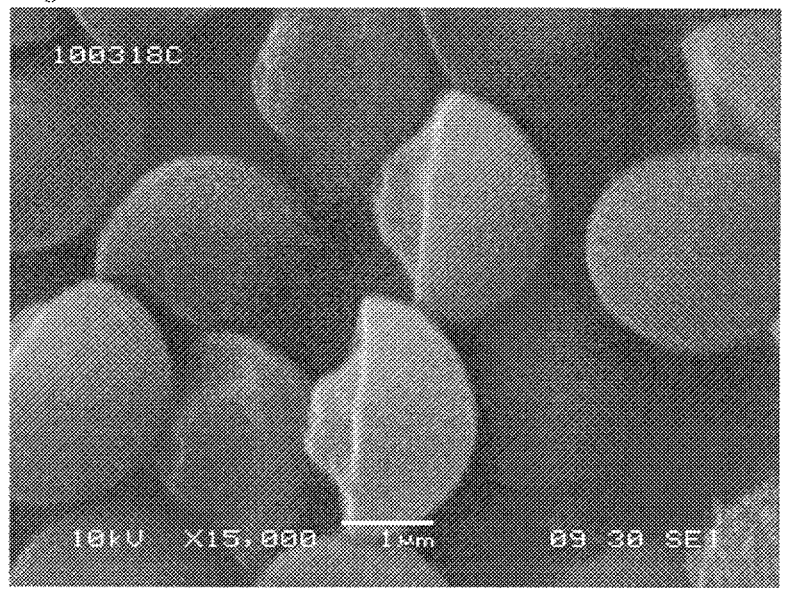
FIG. 6 is a scanning electron microscopic photograph of deformed shaped particles of Example 17.

Resin particles were obtained in the same manner as in Example 1, except that 600 g of methyl methacrylate, 300 g of ethylene glycol dimethacrylate and 100 g of methoxypolyethylene glycol monomethacrylate (Blemmer PME-400) were used as polymerizable vinyl type monomers and the emulsion containing seed particles produced in Production Example 5 of seed particles was used. When the obtained resin particles were observed by a scanning electron microscope, the resin particles were mushroom-type deformed shaped particles as shown in FIG. 6 (A=2.65 µm, D1=0.91 µm, D2=1.29 µm, E=0.65 µm). The volume average particle diameter in conversion into spheres of the deformed shaped particles was 2.62 µm.

Comparative Example 1

Resin particles were obtained in the same manner as in Example 1, except that the emulsion containing seed particles produced in Production Example 4 of seed particles was used. When the obtained resin particles were observed by a scanning electron microscope, the resin particles were spherical particles (particle diameter 2.55 µm).

Comparative Example 2

Figure 7:
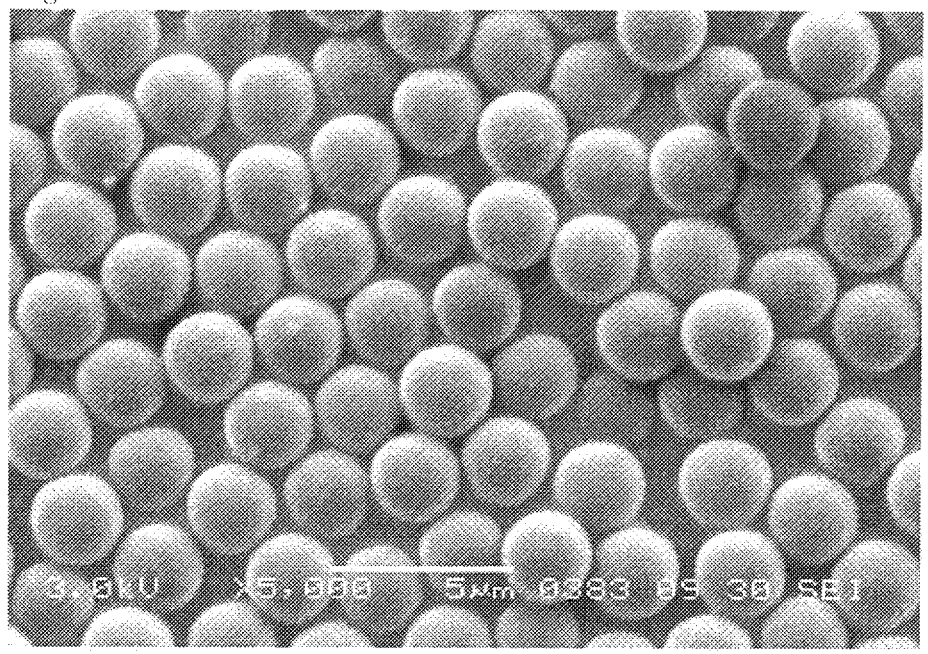
FIG. 7 is a scanning electron microscopic photograph of deformed shaped particles of Comparative Example 2.

Resin particles were obtained in the same manner as in Example 1, except that 180 g of the emulsion containing seed particles produced in Production Example 6 of seed particles was used. When the obtained resin particles were observed by a scanning electron microscope, the resin particles were spherical particles as shown in FIG. 7 (particle diameter 2.49 µm).

Comparative Example 3

A polymerization was carried out in the same manner as in Example 1, except that 300 g of methyl methacrylate, 200 g of ethylene glycol dimethacrylate and 500 g of poly(ethylene glycol-propylene glycol)monomethacrylate (product name: Blemmer 50 PEP-300) were used as polymerizable vinyl type monomers. However, a polymerization stability was insufficient and an agglomeration of particles occurred noticeably during the polymerization.

The raw materials and their amounts used for Examples and Comparative Examples, the swelling magnification, and the particle shapes are collectively shown in Table 1.

TABLE 1

| | | seed particles | | | | | polymerizable vinyl type monomer | | | | |
| --- | --- | --- | --- | --- | --- | --- | --- | --- | --- | --- | --- |
| | production Ex. No. | monomer | molecular weight adjustment agent & amount | particle diameter | molecular weight | used amount | main monomer & amount | cross-linkable monomer & amount | (RO)n group containing monomer amount | swelling magnification | shape of particles |
| Ex. 1 | 1 | IBMA | DM0.3 | 1.0 µm | 610000 | 5 | MMA60 | EGDMA30 | 10 | 20 | semi-spherical shape |
| 2 | 1 | IBMA | DM0.3 | 1.0 µm | 610000 | 5 | MMA70 | EGDMA20 | 10 | 20 | semi-spherical shape |
| 3 | 1 | IBMA | DM0.3 | 1.0 µm | 610000 | 5 | MMA80 | EGDMA10 | 10 | 20 | semi-spherical shape |
| 4 | 7 | IBMA | DM0.3 | 1.0 µm | 260000 | 5 | MMA60 | EGDMA30 | 10 | 20 | semi-spherical shape |
| 5 | 3 | IBMA | DM0.3 | 1.5 µm | 400000 | 5 | MMA65 | EGDMA30 | 5 | 20 | semi-spherical shape |
| 6 | 1 | IBMA | DM0.3 | 1.0 µm | 610000 | 5 | MMA70 | EGDMA30 | — | 20 | double sided convex lens-like shape |
| 7 | 1 | IBMA | DM0.3 | 1.0 µm | 610000 | 5 | St60 | EGDMA30 | 10 | 40 | double sided convex lens-like shape |
| 8 | 1 | IBMA | DM0.3 | 1.0 µm | 610000 | 5 | St60 | EGDMA30 | 10 | 20 | double sided convex lens-like shape |

TABLE 1-continued

| | | seed particles | | | | | polymerizable vinyl type monomer | | | | |
|---|---|---|---|---|---|---|---|---|---|---|---|
| | production Ex. No. | monomer | molecular weight adjustment agent & amount | particle diameter | molecular weight | used amount | main monomer & amount | cross-linkable monomer & amount | (RO)n group containing monomer amount | swelling magnification | shape of particles |
| | 9 | 1 IBMA | DM0.3 | 1.0 μm | 610000 | 5 | MMA60 | EGDMA30 | 10 | 40 | horseshoe type sectional shape |
| | 10 | 3 IBMA | DM0.3 | 1.5 μm | 400000 | 5 | MMA60 | EGDMA30 | 10 | 20 | horseshoe type sectional shape |
| | 11 | 8 IBMA | DM0.3 | 1.67 μm | 500000 | 5 | MMA60 | EGDMA30 | 10 | 20 | horseshoe type sectional shape |
| | 12 | 5 IBMA | — | 1.0 μm | 830000 | 5 | MMA60 | EGDMA30 | 10 | 20 | mushroom-type shape |
| | 13 | 9 IBMA | DM0.5 | 0.6 μm | 350000 | 5 | MMA60 | EGDMA30 | 10 | 20 | double sided convex lens-like shape |
| | 14 | 1 IBMA | DM0.3 | 1.0 μm | 610000 | 5 | MMA60 | EGDMA30 | 10 | 20 | semi-spherical shape |
| | 15 | 2 TBA | DM0.5 | 1.0 μm | 450000 | 5 | MMA60 | EGDMA30 | 10 | 20 | double sided convex lens-like shape |
| | 16 | 5 IBMA | — | 1.0 μm | 830000 | 5 | MMA60 | EGDMA30 | 10 | 20 | mushroom-type shape |
| | 17 | 5 IBMA | — | 1.0 μm | 830000 | 5 | MMA60 | EGDMA30 | 10 | 20 | mushroom-type shape |
| Com. Ex. | 1 | 4 MMA | DM0.3 | 1.0 μm | 400000 | 5 | MMA60 | EGDMA30 | 10 | 20 | spherical |
| | 2 | 6 IBMA | OM0.6 | 1.0 μm | 25000 | 2.5 | MMA60 | EGDMA30 | 10 | 20 | spherical |
| | 3 | 1 IBMA | DM0.3 | 1.0 μm | 610000 | 5 | MMA30 | EGDMA20 | 50 | 20 | polymerization unstable |

In Table 1, IBMA is isobutyl methacrylate; MMA is methyl methacrylate; DM is n-dodecyl mercaptan; OM is n-octyl mercaptan; St is styrene; EGDMA is ethylene glycol dimethacrylate; the (RO)n group-containing monomer means Blemmer PP-1000 for Example 14, Blemmer 70 PEP-350B for Example 16, Blemmer PME-400 for Example 17, and Blemmer 50 PEP-300 for others.

Further, the molecular weight adjustment agent amount means the amount per 100 parts by weight of the monomer for producing the seed particles: the molecular weight means the weight average molecular weight: the use amount of the seed particles means wt. % in the total of the polymerizable vinyl type monomers and the seed particles: the main monomer amount, the crosslinkable monomer amount, and the amount of the (RO)n group-containing monomer mean part(s) by weight, respectively.

Production Examples of Optical Sheet

Production Example A1

The deformed shaped particles (particles having a horseshoe type sectional shape) of Example 9 and an acrylic type binder (trade name: Medium VM (K), manufactured by Dainichiseika Color & Chemicals Mfg, Co., Ltd. (solid matter 32%), transparent substrate resin-containing binder) were mixed at a ratio of 100 parts by weight and 310 parts by weight, respectively. To the obtained mixture was added 240 parts by weight of a solution obtained by mixing toluene and methyl ethyl ketone as solvents at 1:1. The resulting mixed solution was stirred by a centrifugal stirrer for 3 minutes and left for 3 hours. Thereafter, to the mixed solution was added 30 parts by weight of a curing agent (trade name: Medium VM, manufactured by Dainichiseika Color & Chemicals Mfg, Co., Ltd.), and again stirred for 3 minutes by a centrifugal stirrer. The resulting mixed solution (coating agent) was applied to a PET film by using a #80 bar coater. The obtained applied film was dried for 1 hour by a drier kept at 70° C. to obtain a light diffusible coating A (coating film). A haze and total light transmittance of the obtained coating were measured. A dropping resistant property of the deformed shaped particles was tested. The results are shown in Table 2.

The haze and the total light transmittance are values measured by a haze meter (Haze meter "NDH 2000", manufacture by Nippon Denshoku Industries Co., Ltd.) according to JIS K7105.

The dropping resistant property of the deformed shaped particles was evaluated by scratching a surface of each coating with a black cloth 20 times, and observing white deformed shaped particles dropped from the coating and adhered to the cloth with eyes. Those of which a large quantity of the deformed shaped particles were observed were marked with x: those of which a small amount of the deformed shaped particles were observed were marked with Δ: and those of which no deformed shaped particle was observed were marked with ○.

Production Example A2

A light diffusible coating B was obtained by using the deformed shaped particles (particles with a horseshoe type sectional shape) of Example 10 in place of the deformed shaped particles of Example 9. A haze and total light transmittance of the obtained coating were measured. A dropping resistant property of the deformed shaped particles was tested. The results are shown in Table 2.

Production Example A3

A light diffusion coating C was obtained by using the deformed shaped particles (semi-spherical particles) of Example 1 in place of the deformed shaped particles of Example 9. A haze and total light transmittance of the obtained coating were measured. A dropping resistant property of the deformed shaped particles was tested. The results are shown in Table 2.

Production Example A4

A light diffusion coating D was obtained by using the deformed shaped particles (double sided convex lens-like particles) of Example 6 in place of the deformed shaped particles of Example 9. A haze and total light transmittance of the obtained coating were measured. A dropping resistant property of the deformed shaped particles was tested. The results are shown in Table 2.

Comparative Production Example A 1

A light diffusion coating E was obtained by using the spherical particles of Comparative Example 1 in place of the deformed shaped particles of Example 9. A haze and total light transmittance of the obtained coating were measured. A dropping resistant property of the deformed shaped particles was tested. The results are shown in Table 2.

TABLE 2

|  | production Ex. A1 | production Ex. A2 | production Ex. A3 | production Ex. A4 | production Com. Ex. A1 |
|---|---|---|---|---|---|
| total light transmittance (%) | 87.4 | 85.4 | 86.4 | 85.7 | 90.1 |
| haze (%) | 88.1 | 87.1 | 89.1 | 90.1 | 80.3 |
| dropping property test | Δ | Δ | ○ | ○ | x |

It can be seen from Production Examples A1 to A4 and Comparative Production Example A1 that the deformed shaped particles could give higher haze and more excellent light diffusion property to light diffusible coatings than the spherical particles. It can also be seen that the light diffusible coatings using the deformed shaped particles are suppressed in terms of dropping properties of the particles as compared with the light diffusible coating using the spherical particles.

Production Examples of Light Diffusion Plate

Production Example B1

After 0.5 parts by weight of the deformed shaped particles (particles with a horseshoe type sectional shape) obtained in Example 9 were added to 100 parts by weight of a polystyrene resin (HRM 40, manufactured by Toyo Styrene Co., Ltd.) and blended, the resultant was supplied to an extruder to obtain master pellets. The pellets were supplied to an injection molding apparatus and molded by injection molding to obtain a light diffusion plate A with a length of 100 mm, a width of 50 mm, and a thickness of 2 mm. A total light transmittance and haze of the obtained light diffusion plate were measured in the same manner as in that for the above-mentioned optical sheets. The results are shown in Table 3.

Production Example B2

A light diffusion plate B was obtained by using the defog Hied shaped particles (particles with a horseshoe type sectional shape) of Example 10 in place of the deformed shaped particles of Example 9. A haze and total light transmittance of the obtained diffusion plate were measured. The results are shown in Table 3.

Production Example B3

A light diffusion plate C was obtained by using the deformed shaped particles (semi-spherical particles) of Example 1 in place of the deformed shaped particles of Example 9. A haze and total light transmittance of the obtained diffusion plate were measured. The results are shown in Table 3.

Production Example B4

A light diffusion plate D was obtained by using the defog hied shaped particles (double sided convex lens-like particles) of Example 6 in place of the deformed shaped particles of Example 9. A haze and total light transmittance of the obtained diffusion plate were measured. The results are shown in Table 3.

Comparative Production Example B1

A light diffusion plate E was obtained by using the spherical particles of Comparative Example 1 in place of the deformed shaped particles of Example 9. A haze and total light transmittance of the obtained diffusion plate were measured. The results are shown in Table 3.

TABLE 3

|  | production Ex. B1 | production Ex. B2 | production Ex. B3 | production Ex. B4 | production Com. Ex. B1 |
|---|---|---|---|---|---|
| total light transmittance (%) | 79.4 | 77.3 | 75.4 | 73.4 | 84.4 |
| haze (%) | 97.1 | 97.3 | 98.2 | 98.4 | 94.9 |

From Production Examples B1 to B4 and Comparative Production Example B1, it can be seen that the deformed shaped particles could give higher haze and more excellent light diffusion property to the light diffusion plates than the spherical particles.

Production Examples of Cosmetics

Production Example C1

The followings were supplied to a mixer and mixed evenly:
the deformed shaped particles obtained in Example 9 (particles with a horseshoe type sectional shape) 10 parts by weight,
white petrolatum (trade name: Hakuwase White, manufactured by Iwaki Seiyaku Co., Ltd.) 2 parts by weight,
tri(capryl, caprylic acid) glycerin 6 parts by weight,
dimethyl-polysiloxane (viscosity at 25° C.: 34 mPa·s) 3 parts by weight, talc (trade name: LMP-90, manufactured by Fuji Talc Industries Co., Ltd.) 30 parts by weight, sericite (trade name: Sericite FSE, manufactured by Sanshin Mining Ind. Co., Ltd.) 37.5 parts by weight, titanium oxide (trade name: MT-500SA, manufactured by Tayca Corporation) 10 parts by weight, iron oxide (a mixture of 67 wt. % of yellow iron oxide (trade name: TAROX LL-XLO, manufactured by Titan Kogyo K. K.), 27 wt. % of red iron oxide (trade name: TAROX R-5,6-L, manufactured by Titan Kogyo K. K.) and 6 wt. % of black iron oxide (trade name: TAROX BL-100, manufactured by Titan Kogyo K. K.)) 1.5 parts by weight, and an antiseptic agent. The obtained mixture was passed through a mesh and compacted in a metal saucer by dies to obtain a solidified powder cosmetic. The above-mentioned talc, sericite, titanium oxide and iron oxide were used after all were surface-treated by a perfluoroalkyl phosphoric acid diethanolamine salt.

Production Example C2

A solidified powder cosmetic was obtained by using the deformed shaped particles (particles with a horseshoe type sectional shape) obtained in Example 10 in place of the deformed shaped particles of Example 9.

Production Example C3

A solidified powder cosmetic was obtained by using the deformed shaped particles (semi-spherical particles) obtained in Example 1 in place of the deformed shaped particles of Example 9.

Production Example C4

A solidified powder cosmetic was obtained by using the deformed shaped particles (double sided convex lens-like particles) obtained in Example 6 in place of the deformed shaped particles of Example 9.

DESCRIPTION OF REFERENCE SYMBOLS

A: Particle diameter
B: Depth
C: Width
D1: Width
D2: Width
E: Height
F: Height
H: Height
I: Height

What is claimed is:

1. A method for producing a deformed-shaped particle comprising:
absorbing a polymerizable vinyl type monomer contained in the aqueous phase of an aqueous emulsion into a seed particle and polymerizing the absorbed polymerizable vinyl type monomer, wherein the aqueous phase includes only water or a mixture of water and a water-soluble solvent, and,
wherein the seed particle is a resin particle which is derived from a (meth)acrylic ester having an ester part containing at least an alkyl group of 3-5 carbon atoms, and which have a weight average molecular weight of 150000 to 1000000 as measured by gel permeation chromatography and the polymerizable vinyl type monomer contains 5 to 50 wt. % of a crosslinkable monomer based on the entire amount of the polymerizable vinyl type monomer.

2. The method for producing the deformed-shaped particle of claim 1, wherein the alkyl group with the number of carbon atoms of 3-5 in the ester part of the (meth)acrylic ester is a branched alkyl group.

3. The method for producing the deformed-shaped particles of claim 1, wherein the polymerizable vinyl type monomer contains, in a range of greater than 0 and up to 40 wt. %, a (meth)acrylic ester having an alkylene oxide group defined by the following formula:

wherein $R_1$ is H or $CH_3$; $R_2$ and $R_3$ are different from other and are an alkylene group selected from $C_2H_4$, $C_3H_6$, $C_4H_8$, and $C_5H_{10}$; m is 0 to 50; n is 0 to 50; m and n are not simultaneously 0; and $R_4$ is H or $CH_3$.

4. The method for producing the deformed-shaped particle of claim 3, wherein m is 0 to 30; and n is 0 to 30.

5. The method for producing the deformed-shaped particle of claim 1, wherein the deformed-shaped particle has a recessed sectional shape having a notch around the diameter, a mushroom-type shape, a semi-spherical shape, or a double sided convex lens-like shape, the particles having these shapes being separately formed by adjusting the weight average molecular weight of the seed particle, the amount of the polymerizable vinyl type monomer of the seed particles, and the amount of the (meth)acrylic ester having an alkylene oxide group.

6. A deformed-shaped particle having a recessed sectional shape having a notch around the diameter, a mushroom-type shape, a semi-spherical shape, or a double sided convex lens-like shape, obtained by the method of claim 1.

7. A deformed-shaped particle comprising a notch around the diameter and made of a polymer derived from a polymerizable vinyl type monomer containing 5 to 50 wt. % of a crosslinkable monomer.

8. A deformed-shaped particle comprising a mushroom-type shape and made from a polymer derived from a polymerizable vinyl type monomer containing 5 to 50 wt. % of a crosslinkable monomer.

9. A composition for coating containing the deformed shaped particles of claim 6, and a binder.

10. A laminate comprising a substrate, and a coating film obtained by coating the substrate with the composition for coating of claim 9.

11. The laminate of claim 10, wherein the substrate is a transparent substrate, and the laminate is used in an optical use.

12. A master pellet containing the deformed-shaped particle of claim 6, and a transparent resin.

13. A molded article obtained by using the master pellet of claim 12.

14. A cosmetic of a powder type or liquid type comprising the deformed-shaped particle of claim 6, and an oil agent.

* * * * *

UNITED STATES PATENT AND TRADEMARK OFFICE
CERTIFICATE OF CORRECTION

| | | |
|---|---|---|
| PATENT NO. | : 8,568,750 B2 | Page 1 of 1 |
| APPLICATION NO. | : 13/201305 | |
| DATED | : October 29, 2013 | |
| INVENTOR(S) | : Harada | |

It is certified that error appears in the above-identified patent and that said Letters Patent is hereby corrected as shown below:

In the Claims

Column 24, line 21 (claim 3) please insert --each-- before other.

Signed and Sealed this
Third Day of June, 2014

Michelle K. Lee
*Deputy Director of the United States Patent and Trademark Office*